United States Patent
Wu

(10) Patent No.: US 10,333,760 B2
(45) Date of Patent: Jun. 25, 2019

(54) OFDM-BASED DATA TRANSMISSION METHOD AND APPARATUS

(71) Applicant: HUAWEI TECHNOLOGIES CO., LTD., Shenzhen, Guangdong (CN)

(72) Inventor: Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,100

(22) Filed: May 4, 2018

(65) Prior Publication Data

US 2018/0254938 A1    Sep. 6, 2018

Related U.S. Application Data

(63) Continuation of application No. PCT/CN2016/090796, filed on Jul. 21, 2016.

(30) Foreign Application Priority Data

Nov. 6, 2015   (CN) .......................... 2015 1 0750045

(51) Int. Cl.
*H04L 27/00* (2006.01)
*H04L 27/26* (2006.01)
(Continued)

(52) U.S. Cl.
CPC ...... *H04L 27/2666* (2013.01); *H04L 27/0014* (2013.01); *H04L 27/06* (2013.01);
(Continued)

(58) Field of Classification Search
CPC ............. H04L 27/2666; H04L 27/3872; H04L 27/0014; H04L 27/2276; H04L 27/2646;
(Continued)

(56) References Cited

U.S. PATENT DOCUMENTS

2005/0195765 A1    9/2005  Sharon et al.
2009/0067534 A1    3/2009  Kwak et al.
(Continued)

FOREIGN PATENT DOCUMENTS

CN         1921466 A      2/2007
CN       101645863 A      2/2010
(Continued)

OTHER PUBLICATIONS

International Search Report issued in International Application No. PCT/CN2016/090796 dated Oct. 13, 2016, 12 pages.
(Continued)

*Primary Examiner* — Dac V Ha
(74) *Attorney, Agent, or Firm* — Fish & Richardson P.C.

(57) ABSTRACT

Embodiments of the present disclosure relate to an OFDM-based data transmission method and an apparatus. In one example method, a transmitting device generates a data packet. The data packet comprises at least one orthogonal frequency division multiplexing (OFDM) symbol. The OFDM symbol comprises N sequentially numbered subcarriers. The N subcarriers are divided into L subblocks. Each subblock of the L subblocks comprises $\lfloor N/L \rfloor$ subcarriers including M pilot subcarriers. Start subcarriers of adjacent subblocks are adjacently numbered subcarriers. A numbering interval is the same for adjacent subcarriers in each subblock of the L subblocks. Each subblock of the L subblocks corresponds to one phase rotation signal. Signals carried on the subcarriers in each subblock of the L subblocks are signals obtained by multiplying original signals by a corresponding phase rotation signal. The transmitting device sends the data packet.

18 Claims, 2 Drawing Sheets

(51) Int. Cl.
*H04L 27/06* (2006.01)
*H04L 27/227* (2006.01)
*H04L 27/38* (2006.01)
*H04L 5/00* (2006.01)

(52) U.S. Cl.
CPC ...... *H04L 27/2276* (2013.01); *H04L 27/2621* (2013.01); *H04L 27/2646* (2013.01); *H04L 27/3872* (2013.01); *H04L 5/0007* (2013.01); *H04L 27/2672* (2013.01); *H04L 27/2675* (2013.01); *H04L 2027/0048* (2013.01)

(58) Field of Classification Search
CPC . H04L 27/2621; H04L 27/06; H04L 27/2675; H04L 27/2672; H04L 5/0007; H04L 2027/0048
See application file for complete search history.

(56) References Cited

U.S. PATENT DOCUMENTS

| | | |
|---|---|---|
| 2011/0150115 A1 | 6/2011 | Schmidl et al. |
| 2011/0182380 A1* | 7/2011 | Muhammad ........ H04L 27/2628 375/295 |
| 2012/0287771 A1* | 11/2012 | Loghin ............... H04L 27/2634 370/210 |
| 2014/0050259 A1* | 2/2014 | Azizi ................. H04L 27/2647 375/232 |
| 2016/0043882 A1 | 2/2016 | Shen et al. |

FOREIGN PATENT DOCUMENTS

| | | |
|---|---|---|
| CN | 101803256 A | 8/2010 |
| CN | 102656856 A | 9/2012 |
| CN | 104104623 A | 10/2014 |
| WO | 2015012816 A1 | 1/2015 |

OTHER PUBLICATIONS

Guo Lei et al: "Twofold peak-to-average power ratio reduction technique in direct-detection optical orthogonal frequency division multiplexing system", Optical Engineering, Soc. of Photo-Optical Instrumentation Engineers, Bellingham, vol. 54, No. 3, Mar. 1, 2015, XP060053989, 10 pages.

Communication Pursuant to Rule 164(1) EPC issued in European Application No. 16861336.2 dated Aug. 23, 2018, 13 pages.

Chinese Office Action issued in Chinese Application No. 201510750045.5 dated Apr. 9, 2019, 5 pages.

* cited by examiner

OFDM-BASED DATA TRANSMISSION METHOD AND APPARATUS

CROSS-REFERENCE TO RELATED APPLICATIONS

This application is a continuation of International Application No. PCT/CN2016/090796, filed on Jul. 21, 2016, which claims priority to Chinese Patent Application No. 201510750045.5, filed on Nov. 6, 2015. The disclosures of the aforementioned applications are hereby incorporated by reference in their entireties.

TECHNICAL FIELD

The present invention relates to communications technologies, and in particular, to an OFDM-based data transmission method and an apparatus.

BACKGROUND

An amplifier is an important device in a communications system. Due to a saturation feature of the amplifier, even for a linear amplifier, non-linear distortion may be generated at an output end. The non-linear distortion results in out-of-band radiation and in-band distortion, affecting performance of a transmitting device and a receiving device. Generally, a smaller peak-to-average power ratio (Peak to Average Power Ratio, PAPR for short) means a lower requirement on a linear working range of the amplifier. The PAPR is a ratio of a maximum power to an average power of signals.

802.11ad is a subsystem in the 802.11 series adopted by a wireless local area network (Wireless Local Area Network, WLAN for short), available at a 60 GHz band, and mainly used for transmission of wireless high-definition audio and video signals in a family, to provide a more complete high-definition video solution for family multimedia applications. Therefore, 802.11ad is also referred to as wireless gigabit (Wireless Gigabit, WiGig for short). One implementation solution of the 802.11ad technology is an orthogonal frequency division multiplexing (Orthogonal Frequency Division Multiplexing, OFDM for short) system. One OFDM symbol includes N subcarriers, and the N subcarriers include a guard subcarrier, a direct current subcarrier, a data subcarrier, and a pilot subcarrier. The data subcarrier is used to carry data, and the pilot subcarrier is mainly used for a receiving device to detect a phase deviation between a transmitting device and the receiving device. Because an OFDM symbol is an overlap of multiple subcarrier signals, a large PAPR may be generated if multiple subcarriers with identical or similar phases overlap at a moment. Therefore, it is critical for the OFDM system to reduce the PAPR.

In the prior art, a conventional partial transmit sequence (Partial Transmit Sequences, PTS for short) method is used to reduce the PAPR. Specifically, the N subcarriers in one OFDM symbol are divided into multiple subblocks, and subcarriers included in different subblocks are not the same. The transmitting device selects a corresponding phase rotation signal for each subblock, and the receiving device multiplies data received by each subblock by a phase rotation signal corresponding to the subblock to reduce the PAPR.

However, when the prior-art PTS method is used to reduce the PAPR, a dedicated data subcarrier needs to be occupied to transmit the phase rotation signal. This causes a waste of resources and results in a decrease in a throughput.

SUMMARY

The present invention provides an OFDM-based data transmission method and an apparatus, so as to resolve problems of a waste of resources and a decrease in a throughput that are caused by a prior-art method for reducing a PAPR.

A first aspect of embodiments of the present invention provides an OFDM-based data transmission method, including:

generating, by a transmitting device, a data packet, where the data packet includes at least one orthogonal frequency division multiplexing OFDM symbol, where the OFDM symbol includes N sequentially numbered subcarriers, the N subcarriers are divided into L subblocks, each subblock includes $\lfloor N/L \rfloor$ subcarriers, the $\lfloor N/L \rfloor$ subcarriers in each subblock include M pilot subcarriers, start subcarriers of adjacent subblocks are adjacently numbered subcarriers, and a numbering interval is the same for adjacent subcarriers in each subblock; and each subblock is corresponding to one phase rotation signal, and signals carried on all subcarriers in each subblock are signals obtained by multiplying original signals by a corresponding phase rotation signal, where N is an even number, L is a positive integer, $\lfloor N/L \rfloor$ is a positive integer, and M is a positive integer less than $\lfloor N/L \rfloor$; and sending, by the transmitting device, the data packet.

A second aspect of the embodiments of the present invention provides an OFDM-based data transmission method, including:

receiving, by a receiving device, a data packet sent by a transmitting device, where the data packet includes at least one orthogonal frequency division multiplexing OFDM symbol, where the OFDM symbol includes N sequentially numbered subcarriers, the N subcarriers are divided into L subblocks, each subblock includes $\lfloor N/L \rfloor$ subcarriers, the $\lfloor N/L \rfloor$ subcarriers in each subblock include M pilot subcarriers, start subcarriers of adjacent subblocks are adjacently numbered subcarriers, and a numbering interval is the same for adjacent subcarriers in each subblock; and each subblock is corresponding to one phase rotation signal, and signals carried on all subcarriers in each subblock are signals obtained by multiplying original signals by a corresponding phase rotation signal, where N is an even number, L is a positive integer, $\lfloor N/L \rfloor$ is a positive integer, and M is a positive integer less than $\lfloor N/L \rfloor$;

obtaining, by the receiving device according to signals carried on pilot subcarriers in the L subblocks, a product of the phase rotation signal corresponding to each subblock and a phase deviation signal, and obtaining, by means of calculation, a conjugate signal corresponding to the product of the phase rotation signal corresponding to each subblock and the phase deviation signal, where the phase deviation signal represents a phase deviation between the transmitting device and the receiving device; and obtaining, by the receiving device according to the conjugate signal corresponding to each subblock and the signals carried on the subcarriers in each subblock, original signals carried on the subcarriers in each subblock.

A third aspect of the embodiments of the present invention provides a transmitting device, including:

a signal processor, configured to generate a data packet, where the data packet includes at least one orthogonal frequency division multiplexing OFDM symbol, where the OFDM symbol includes N sequentially numbered subcarriers, the N subcarriers are divided into L subblocks, each subblock includes $\lfloor N/L \rfloor$ subcarriers, the $\lfloor N/L \rfloor$ subcarriers in each subblock include M pilot subcarriers, start subcarriers of adjacent subblocks are adjacently numbered subcarriers, and a numbering interval is the same for adjacent subcarriers in each subblock; and each subblock is corresponding to one phase rotation signal, and signals carried on all subcarriers in each subblock are signals obtained by multiplying original signals by a corresponding phase rotation signal, where N is an even number, L is a positive integer, $\lfloor N/L \rfloor$ is a positive integer, and M is a positive integer less than $\lfloor N/L \rfloor$; and a transmitter, configured to send the data packet.

A fourth aspect of the embodiments of the present invention provides a receiving device, including:

a receiver, configured to receive a data packet sent by a transmitting device, where the data packet includes at least one orthogonal frequency division multiplexing OFDM symbol, where the OFDM symbol includes N sequentially numbered subcarriers, the N subcarriers are divided into L subblocks, each subblock includes $\lfloor N/L \rfloor$ subcarriers, the $\lfloor N/L \rfloor$ subcarriers in each subblock include M pilot subcarriers, start subcarriers of adjacent subblocks are adjacently numbered subcarriers, and a numbering interval is the same for adjacent subcarriers in each subblock; and each subblock is corresponding to one phase rotation signal, and signals carried on all subcarriers in each subblock are signals obtained by multiplying original signals by a corresponding phase rotation signal, where N is an even number, L is a positive integer, $\lfloor N/L \rfloor$ is a positive integer, and M is a positive integer less than $\lfloor N/L \rfloor$; and a signal processor, configured to: obtain, according to signals carried on pilot subcarriers in the L subblocks, a product of the phase rotation signal corresponding to each subblock and a phase deviation signal, and obtain, by means of calculation, a conjugate signal corresponding to the product of the phase rotation signal corresponding to each subblock and the phase deviation signal; and obtain, according to the conjugate signal corresponding to each subblock and the signals carried on the subcarriers in each subblock, original signals carried on the subcarriers in each subblock.

According to the OFDM-based data transmission method and the apparatus in the present invention, in the OFDM symbol in the data packet sent by the transmitting device, the original signals carried on the subcarriers in each subblock are multiplied by the corresponding phase rotation signal. After receiving the OFDM symbol, the receiving device may obtain, according to the pilot subcarriers, the phase rotation signal corresponding to each subblock, and then obtain the original signals, so that there is no need to carry the phase rotation signal on a dedicated data subcarrier, and resources are greatly saved. In addition, according to the subcarrier division, the start subcarriers of the adjacent subblocks are adjacently numbered subcarriers, and the numbering interval is the same for the adjacent subcarriers in each subblock. This division method ensures that each subblock includes a pilot subcarrier, and further ensures that the receiving device can obtain, according to the signals carried on the pilot subcarrier in each subblock, the phase rotation signal corresponding to each subblock.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
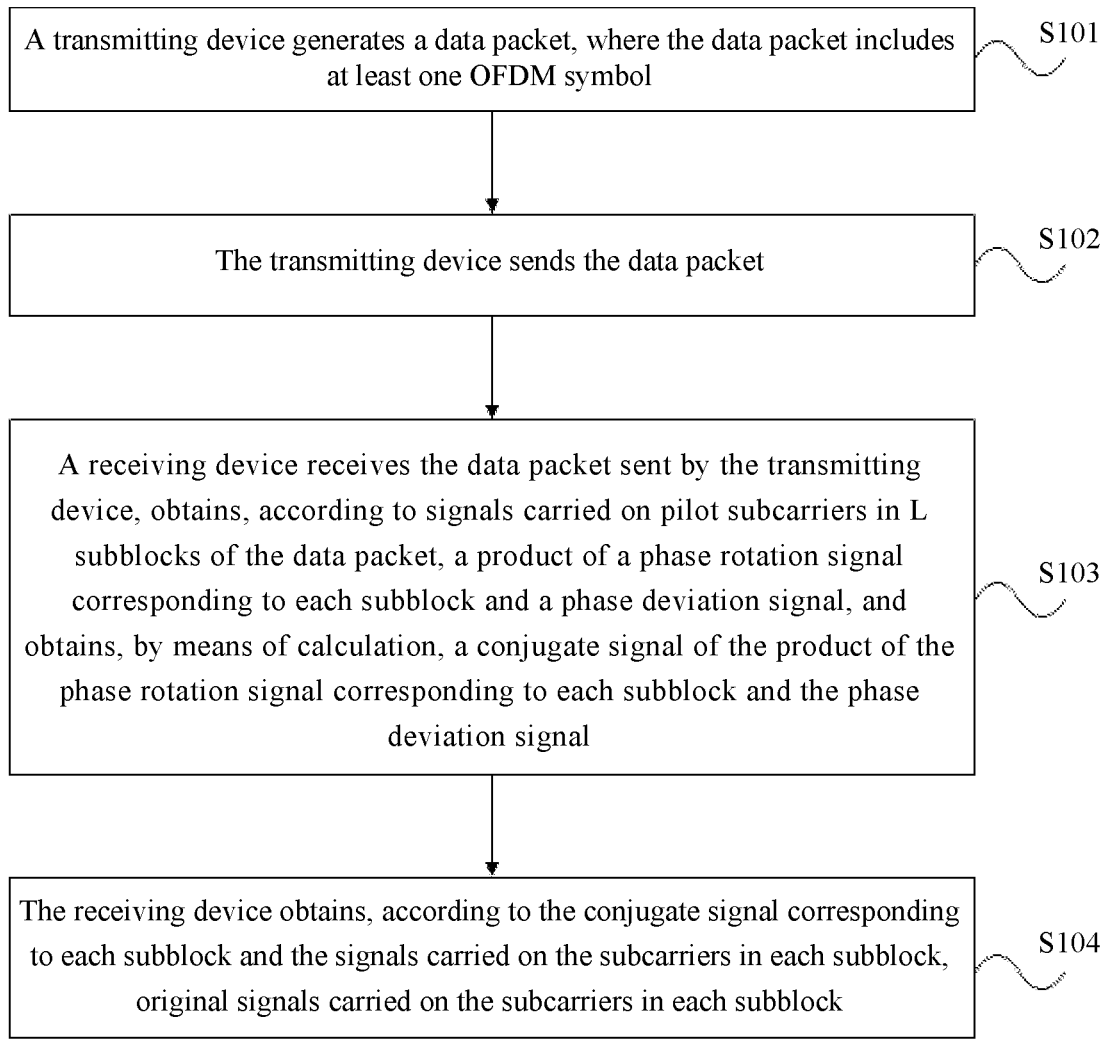
FIG. 1 is a schematic flowchart of an embodiment of an OFDM-based data transmission method according to the present invention.

The embodiments of the present invention are applied to a WLAN OFDM system, and may be applicable to the 802.11ad standard and the next generation 802.11ay standard. In the 802.11ad standard, data is transmitted by using only one channel at a time. In the 802.11ay standard, to meet a higher rate indicator and better improve a throughput, two or three channels may be used at a time, that is, two or three channels may be converged. Specifically, in an existing global spectrum of 60 GHz, one channel is 2.16 GHz, and there is a total of four channels. For one channel, one OFDM symbol includes 512 subcarriers. When two channels are converged, one OFDM symbol includes 1,024 subcarriers. When three channels are converged, one OFDM symbol includes 1,536 subcarriers.

In the embodiments of the present invention, to resolve a prior-art problem that a dedicated data subcarrier needs to be occupied to transmit a phase rotation signal, a transmitting device multiplies, by a corresponding phase rotation signal, original signals carried on each subcarrier in each subblock in an OFDM symbol, and then a receiving device obtains the phase rotation signal corresponding to each subblock according to signals carried on a pilot subcarrier in each subblock. In this way, the receiving device does not need to occupy a data subcarrier to carry the phase rotation signal. In the embodiments of the present invention, each subblock in an OFDM symbol needs to include a pilot subcarrier.

Specifically, it is assumed that numbers of N subcarriers in an OFDM symbol are: $-N/2, (-N/2)-1, \ldots, 0, \ldots, (N/2)-2$, and $(N/2)-1$, where N is an even number. Then, generally, (1) multiple subcarriers numbered from $-N/2$ in an ascending order and multiple subcarriers numbered from $(N/2)-1$ in descending order are used as guard subcarriers. That is, some subcarriers with the first several minimum numbers and the first several maximum numbers are used as guard subcarriers; (2) multiple subcarriers numbered from 0 in an ascending order and multiple subcarriers numbered from 0 in a descending order are used as direct current subcarriers. That is, subcarriers numbered near 0 in the middle and a subcarrier numbered 0 are used as direct current subcarriers; and (3) in the remaining subcarriers, there is one pilot subcarrier at an interval of a preset quantity of subcarrier numbers, and the other subcarriers are data subcarriers. For example, 512 subcarriers corresponding to one channel are sequentially numbered $-256, -255, \ldots, 0, \ldots, 254$, and 255. Guard subcarriers include $-256, -255, \ldots, -178$, and 178, 179, $\ldots$, 254, and 255. Direct current subcarriers include $-1$, 0, and 1. Pilot subcarriers include −150, −130, −110, −90, −70, −50, −30, −10, 10, 30, 50, 70, 90, 110, 130, and 150. The remaining subcarriers are data subcarriers.

The data subcarrier is used to carry to-be-transmitted data. The pilot subcarrier is mainly used to transmit a phase deviation. Due to incomplete synchronization between crystal oscillators of the transmitting device and the receiving device, a phase noise, or another factor, a specified phase deviation exists between the receiving device and the transmitting device, and existence of the phase deviation causes receiving performance of the receiving device to deteriorate. Therefore, the receiving device needs to eliminate a phase deviation of a received signal according to the phase deviation transmitted on the pilot subcarrier. In the embodiments of the present invention, a signal carried on a pilot subcarrier is a product of a phase deviation and a corresponding phase rotation signal.

FIG. 1 is a schematic flowchart of Embodiment 1 of an OFDM-based data transmission method according to the present invention. As shown in FIG. 1, the method includes the following steps.

S101. A transmitting device generates a data packet, where the data packet includes at least one OFDM symbol.

The transmitting device may be an access point (Access Point, AP for short) or a station (station, STA for short) in a WLAN. A receiving device may also be an AP or a STA.

The OFDM symbol includes N sequentially numbered subcarriers. The N subcarriers are divided into L subblocks, each subblock includes $\lfloor N/L \rfloor$ subcarriers, the $\lfloor N/L \rfloor$ subcarriers in each subblock include M pilot subcarriers, and $\lfloor N/L \rfloor$ represents an integer taken from N/L.

In the L subblocks, start subcarriers of adjacent subblocks are adjacently numbered subcarriers, and a numbering interval is the same for adjacent subcarriers in each subblock. That is, N/L subcarriers are extracted as one subblock according to a fixed interval. Because in the N subcarriers, there are a specified quantity of numbers between adjacent pilot subcarriers. Division of subblocks in this manner can ensure that each subblock includes a pilot subcarrier.

For example, when L=4, that start subcarriers of adjacent subblocks are adjacently numbered subcarriers is specifically: a start subcarrier of a first subblock is numbered −N/2, and an end subcarrier of the first subblock is numbered (N/2)−4; a start subcarrier of a second subblock is numbered (−N/2)+1, and an end subcarrier of the second subblock is numbered (N/2)−3; a start subcarrier of a third subblock is numbered (−N/2)+2, and an end subcarrier of the third subblock is numbered (N/2)−2; and a start subcarrier of a fourth subblock is numbered (−N/2)+3, and an end subcarrier of the fourth subblock is numbered (N/2)−1.

When L=2, that start subcarriers of adjacent subblocks are adjacently numbered subcarriers is specifically: a start subcarrier of a first subblock is numbered −N/2, and an end subcarrier of the first subblock is numbered (N/2)−2; and a start subcarrier of a second subblock is numbered (−N/2)+1, and an end subcarrier of the second subblock is numbered (N/2)−1.

For example, when two channels are converged, N is 1,024, and subcarriers are divided into four subblocks, an interval is 4 for adjacent subcarriers in each subblock. Subcarriers in the first subblock are −512:4:508, subcarriers in the second subblock are −511:4:509, subcarriers in the third subblock are −510:4:510, and subcarriers in the fourth subblock are −511:4:511. It should be noted that "−512:4:508" represents a subblock including subcarriers from −512 to 508 at an interval of 4. That is, the subcarriers included in the subblock are numbered "−512, −508, −504, . . . , 500, 504, 508", and the others subcarriers are numbered by analogy.

The foregoing each subblock is corresponding to one phase rotation signal, and signals carried on all subcarriers in each subblock are signals obtained by multiplying original signals by a corresponding phase rotation signal. The phase rotation signal corresponding to each subblock may be selected from a specific set. Specifically, the set to which the phase rotation signal belongs may be $\{1, -1\}$ or $\{1, j, -1, -j\}$. Phases $\phi$ corresponding to $\{1, -1\}$ are 0 and $\pi$ in sequence, and phases $\phi$ corresponding to $\{1, j, -1, -j\}$ are 0, $\pi/2$, $\pi$, and $(3\pi)/2$ in sequence. Certainly, these are several preferred values, but no limitation is set thereto, provided that the phase $\phi$ is in a range of $[0, 2\pi]$.

In a specific implementation, subcarriers in one of the subblocks may be multiplied by a value-known phase rotation signal. For example, if subcarriers are divided into four subblocks, a first subblock may be multiplied by a value-known phase rotation signal "1", or may be not processed, and a second subblock, a third subblock, and a fourth subblock are multiplied by phase rotation signals $e^{-j\Phi_2}$, $e^{-j\Phi_3}$, and $e^{-j\Phi_4}$ respectively. In this way, after the receiving device receives an OFDM symbol, a signal carried on a pilot subcarrier in the first subblock may be recorded as $r_{i1}=h_{i1}p_{i1}e^{j\varphi}$, where i1 is a number of the pilot subcarrier, $h_{i1}$ is a known channel response on the pilot subcarrier, $p_{i1}$ is a pilot signal known to the receiving device, and $\varphi$ is a phase deviation. A signal carried on a pilot subcarrier in the second subblock may be recorded as $r_{i2}=h_{i2}p_{i2}e^{j\varphi}e^{-j\Phi_2}$, where i2 is a number of the subcarrier, $h_{i2}$ is a known channel response on the pilot subcarrier, $p_{i2}$ is a pilot signal known to the receiving device, $\varphi$ is a phase deviation, $e^{j\varphi}$ is a phase deviation signal, and $e^{-j\Phi_2}$ is a phase rotation signal corresponding to the second subblock. The third subblock and the fourth subblock are processed in a similar way, and details are not described herein again.

N is an even number, L is a positive integer, N/L is a positive integer, and M is a positive integer less than N/L.

S102. The transmitting device sends the data packet.

The receiving device receives the foregoing data packet sent by the transmitting device, obtains an OFDM symbol from the data packet, and performs restoration on a signal carried in the OFDM symbol, to obtain an original signal.

S103. A receiving device receives the data packet sent by the transmitting device, obtains, according to signals carried on pilot subcarriers in L subblocks in the data packet, a product of a phase rotation signal corresponding to each subblock and a phase deviation signal, and obtains, by means of calculation, a conjugate signal of the product of the phase rotation signal corresponding to each subblock and the phase deviation signal.

In a specific implementation, after obtaining an OFDM symbol, the receiving device may obtain a phase deviation signal according to a pilot subcarrier in a subblock in which a phase rotation signal is multiplied by a known value, and then obtain a phase rotation signal corresponding to another subblock according to the phase deviation signal. However, this is not limited herein.

Still refer to the foregoing example. The receiving device receives the signal carried on the pilot subcarrier in the foregoing first subblock: $r_{i1}=h_{i1}p_{i1}e^{j\varphi}$, and may obtain a phase deviation $\hat{\varphi}=\angle\{(h_{i1})^*(p_{i1})^*r_{i1}\}$ by means of estimation. $(\cdot)^*$ represents evaluation of a conjugate, $\angle\{\cdot\}$ represents evaluation of a phase, and $(\hat{\cdot})$ represents an estimated value. Further, a phase rotation signal corresponding to the second subblock may be obtained as $e^{-j\hat{\Phi}_2}=e^{-j\hat{\phi}}(h_{t2})^*(p_{t2})^*r_{t2}$ by means of estimation.

S104. The receiving device obtains, according to the foregoing conjugate signal corresponding to each subblock and the signals carried on the subcarriers in each subblock, original signals carried on the subcarriers in each subblock.

In a specific implementation process, the receiving device may multiply a signal carried on a data subcarrier of an OFDM symbol in the received data packet by a "conjugate signal of a product of a phase rotation signal corresponding to each subblock and a phase deviation signal", to obtain an original signal to be transmitted on the data subcarrier. In the foregoing example, an original signal to be transmitted on a data subcarrier in the second subblock may be obtained by multiplying a signal carried on the data subcarrier in the second subblock by $e^{-j\varphi}e^{j\hat{\Phi}_2}$.

In this embodiment, in the OFDM symbol in the data packet sent by the transmitting device, the original signals carried on the subcarriers in each subblock are multiplied by the corresponding phase rotation signal. After receiving the OFDM symbol, the receiving device may obtain, according to the pilot subcarriers, the phase rotation signal corresponding to each subblock, and then obtain the original signals, so that there is no need to carry the phase rotation signal on a dedicated data subcarrier, and resources are greatly saved. In addition, according to the subcarrier division in this embodiment, the start subcarriers of the adjacent subblocks are adjacently numbered subcarriers, and the numbering interval is the same for the adjacent subcarriers in each subblock. This division method ensures that each subblock includes a pilot subcarrier, and further ensures that the receiving device can obtain the phase rotation signal corresponding to each subblock according to the signal carried on the pilot subcarrier in each subblock.

Based on the foregoing embodiment, the transmitting device further sends signaling. The signaling is used to indicate a structure of the OFDM symbol in the foregoing data packet and a quantity of subblocks included in the OFDM symbol. Specifically, the structure of the OFDM symbol includes a division of pilot subcarriers in all subblocks, a manner in which a signal is carried on each subcarrier in the OFDM symbol, and the like. In a specific implementation process, the foregoing signaling may have a corresponding identifier. After receiving the signaling, the receiving device learns, according to the identifier, the data transmission method used by the transmitting device, that is, the used OFDM symbol structure, or the like. In this way, after receiving the foregoing data packet, the receiving device may know to obtain, by using the foregoing corresponding method, an original signal to be transmitted by the OFDM symbol in the data packet. Further, in the foregoing signaling, another identifier may be used to indicate a quantity of subblocks included in the foregoing OFDM symbol.

The foregoing signaling may be carried in the foregoing data packet, or may be sent separately by using an indication frame. This is not limited herein.

Based on the foregoing embodiment, in different cases, quantities of pilot subcarriers and numbers of pilot subcarriers may be different.

Optionally, if two channels are converged and subcarriers are divided into four subblocks, each subblock may be allocated with eight pilot subcarriers. That is, L=4, N=1024, M=8, and a numbering interval is 80 for adjacent pilot subcarriers in a same subblock. Therefore, numbers of M pilot subcarriers included in the first subblock may be: −312, −232, −152, −72, 8, 88, 168, and 248; numbers of M pilot subcarriers included in the second subblock may be: −291, −211, −131, −51, 29, 109, 189, and 269; numbers of M pilot subcarriers included in the third subblock may be: −270, −190, −110, −30, 50, 130, 210, and 290; and numbers of M pilot subcarriers included in the fourth subblock may be: −249, −169, −89, −9, 71, 151, 231, and 331.

Optionally, if two channels are converged and subcarriers are divided into four subblocks, each subblock may be allocated with eight pilot subcarriers. That is, L=4, N=1024, M=8, and a numbering interval is 80 for adjacent pilot subcarriers in a same subblock. Therefore, numbers of M pilot subcarriers included in the first subblock may be: −308, −228, −148, −68, 12, 92, 172, and 252; numbers of M pilot subcarriers included in the second subblock may be: −291, −211, −131, −51, 29, 109, 189, and 269; numbers of M pilot subcarriers included in the third subblock may be: −270, −190, −110, −30, 50, 130, 210, and 290; and numbers of M pilot subcarriers included in the fourth subblock may be: −249, −169, −89, −9, 71, 151, 231, and 331.

Optionally, if three channels are converged and subcarriers are divided into four subblocks, each subblock may be allocated with 12 pilot subcarriers. That is, L=4, N=1536, M=12, and a numbering interval is 80 for adjacent pilot subcarriers in a same subblock. Therefore, numbers of M pilot subcarriers included in the first subblock are: −472, −392, −312, −232, −152, −72, 8, 88, 168, 248, 328, and 408; numbers of M pilot subcarriers included in the second subblock are: −451, −371, −291, −211, −131, −51, 29, 109, 189, 269, 349, and 429; numbers of M pilot subcarriers included in the third subblock are: −430, −350, −270, −190, −110, −30, 50, 130, 210, 290, 370, and 450; and numbers of M pilot subcarriers included in the fourth subblock are: −409, −329, −249, −169, −89, −9, 71, 151, 231, 311, 391, and 471.

Optionally, if three channels are converged and subcarriers are divided into four subblocks, each subblock may be allocated with 12 pilot subcarriers. That is, L=4, N=1536, M=12, and a numbering interval is 80 for adjacent pilot subcarriers in a same subblock. Therefore, numbers of M pilot subcarriers included in the first subblock are: −468, −388, −308, −228, −148, −68, 12, 92, 172, 252, 332, and 412; numbers of M pilot subcarriers included in the second subblock are: −451, −371, −291, −211, −131, −51, 29, 109, 189, 269, 349, and 429; numbers of M pilot subcarriers included in the third subblock are: −430, −350, −270, −190, −110, −30, 50, 130, 210, 290, 370, and 450; numbers of M pilot subcarriers included in the fourth subblock are: −409, −329, −249, −169, −89, −9, 71, 151, 231, 311, 391, and 471.

In addition, if two channels are converged and subcarriers are divided into two subblocks, each subblock may be allocated with 16 pilot subcarriers. That is, L=4, N=1024, and M=12. A numbering interval for adjacent pilot subcarriers may be not unique. For example, numbers of M pilot subcarriers included in the first subblock are: −312, −270, −232, −190, −152, −110, −72, −30, 8, 50, 88, 130, 168, 210, 248, and 290; and numbers of M pilot subcarriers included in the second subblock are: −291, −249, −211, −169, −131, −89, −51, −9, 29, 71, 109, 151, 189, 231, 269, and 331.

Optionally, if two channels are converged and subcarriers are divided into two subblocks, each subblock may be allocated with 16 pilot subcarriers. That is, L=4, N=1024, and M=12. A numbering interval for adjacent pilot subcarriers may be not unique. Numbers of M pilot subcarriers included in the first subblock are: −308, −270, −228, −190, −148, −110, −68, −30, 12, 50, 92, 130, 172, 210, 252, and 290; and numbers of M pilot subcarriers included in the second subblock are: −291, −249, −211, −169, −131, −89, −51, −9, 29, 71, 109, 151, 189, 231, 269, and 331.

If three channels are converged and subcarriers are divided into two subblocks, each subblock may be allocated with 24 pilot subcarriers. That is, L=4, N=1024, and M=24. A numbering interval for adjacent pilot subcarriers may be not unique. Numbers of M pilot subcarriers included in the first subblock are: −472, −430, −392, −350, −312, −270, −232, −190, −152, −110, −72, −30, 8, 50, 88, 130, 168, 210, 248, 290, 328, 370, 408, and 450; and numbers of M pilot subcarriers included in the second subblock are: −451, −409, −371, −329, −291, −249, −211, −169, −131, −89, −51, −9, 29, 71, 109, 151, 189, 231, 269, 311, 349, 391, 429, and 471.

If three channels are converged and subcarriers are divided into two subblocks, each subblock may be allocated with 24 pilot subcarriers. That is, L=4, N=1024, and M=24. A numbering interval for adjacent pilot subcarriers may be not unique. Optionally, numbers of M pilot subcarriers included in the first subblock are: −468, −430, −388, −350, −308, −270, −228, −190, −148, −110, −68, −30, 12, 50, 92, 130, 172, 210, 252, 290, 332, 370, 412, and 450; and numbers of M pilot subcarriers included in the second subblock are: −451, −409, −371, −329, −291, −249, −211, −169, −131, −89, −51, −9, 29, 71, 109, 151, 189, 231, 269, 311, 349, 391, 429, and 471.

It should be noted that the foregoing divisions of pilot subcarriers are merely examples, and this is not limited herein.

Figure 2:
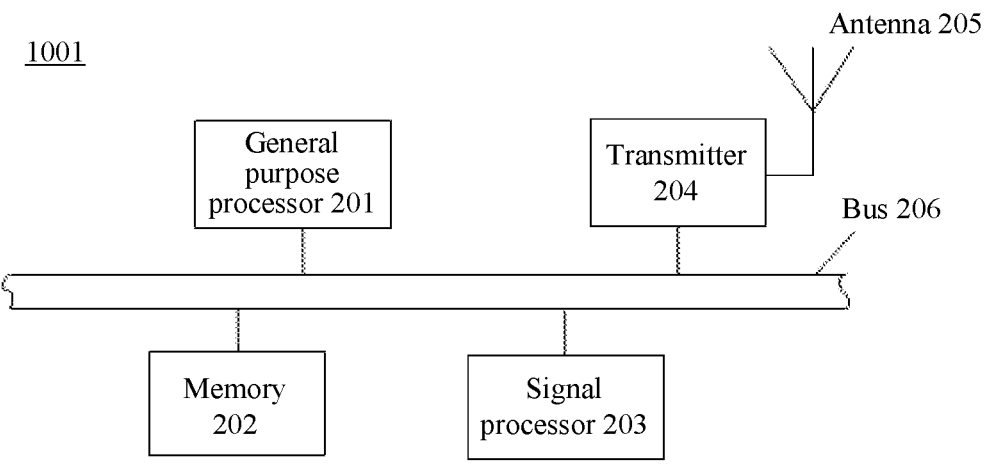
FIG. 2 is a schematic structural diagram of an embodiment of a transmitting device according to the present invention.

FIG. 2 is a schematic structural diagram of Embodiment 1 of a transmitting device according to the present invention. As shown in FIG. 2, the transmitting device 1001 includes: a general purpose processor 201, a memory 202, a signal processor 203, a transmitter 204, and an antenna 205.

The general purpose processor 201, the memory 202, the signal processor 203, the transmitter 204, and the antenna 205 are coupled together by using a bus 206.

Specifically, the general purpose processor 201 controls an operation of the transmitting device 1001. The memory 202 may include a read-only memory and a random access memory, and provide an instruction and data for the general purpose processor 201. The general purpose processor 201 may be a central processing unit CPU, a digital signal processor DSP, an application-specific integrated circuit ASIC, a field programmable gate array FPGA, or another programmable logical device. A part of the memory 202 may further include a non-volatile random access memory (NVRAM). The signal processor 203 is configured to generate a to-be-transmitted signal, and the transmitter 204 transmits a signal by using the antenna 205. The foregoing bus 206 may further include a power bus, a control bus, and a status signal bus, in addition to a data bus. However, for clear description, all buses are marked as the bus 206 in the figure. Specifically, in this embodiment:

The signal processor 203 is configured to generate a data packet, where the data packet includes at least one orthogonal frequency division multiplexing OFDM symbol, where the OFDM symbol includes N sequentially numbered subcarriers, the N subcarriers are divided into L subblocks, each subblock includes ⌊N/L⌋ subcarriers, the ⌊N/L⌋ subcarriers in each subblock include M pilot subcarriers, start subcarriers of adjacent subblocks are adjacently numbered subcarriers, and a numbering interval is the same for adjacent subcarriers in each subblock; and each subblock is corresponding to one phase rotation signal, and signals carried on all subcarriers in each subblock are signals obtained by multiplying original signals by a corresponding phase rotation signal, where N is an even number, L is a positive integer, ⌊N/L⌋ is a positive integer, and M is a positive integer less than ⌊N/L⌋.

The transmitter 204 is configured to send the data packet.

The transmitting device may be an AP or a STA, configured to execute the foregoing method embodiment corresponding to the transmitting device. Implementation principles and technical effects are similar to those described in the method embodiment, and details are not described herein again.

For the numbering and division of the foregoing subcarriers, reference may be made to descriptions of the foregoing method embodiment, and details are not described herein again.

Further, the foregoing transmitter 204 is configured to send signaling. The signaling is used to indicate a structure of the OFDM symbol in the data packet and a quantity of subblocks included in the OFDM symbol. The structure of the OFDM symbol includes: a division of pilot subcarriers in the OFDM symbol in each subblock and a manner in which a signal is carried on each subcarrier in the OFDM symbol.

A set to which the phase rotation signal belongs is {1, −1} or {1, j, −1, −j}.

Figure 3:
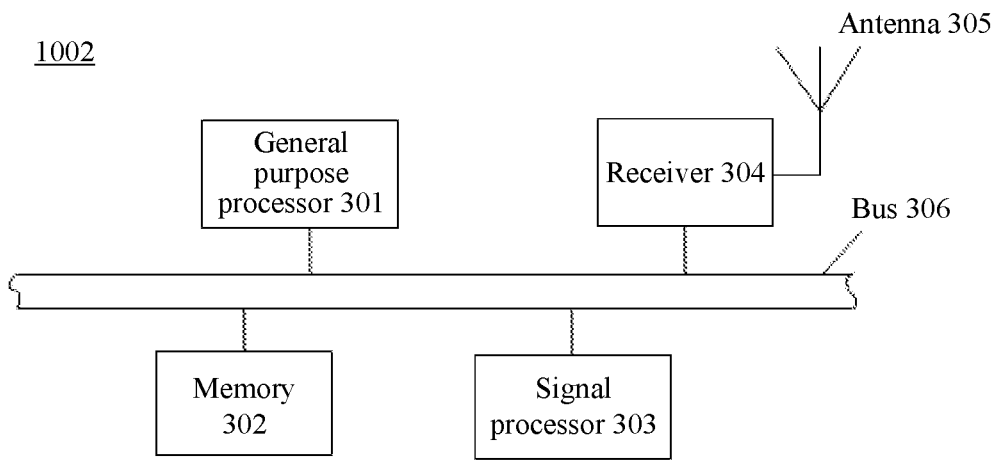
FIG. 3 is a schematic structural diagram of an embodiment of a receiving device according to the present invention.

FIG. 3 is a schematic structural diagram of Embodiment 1 of a receiving device according to the present invention. As shown in FIG. 3, the receiving device 1002 includes: a general purpose processor 301, a memory 302, a signal processor 303, a receiver 304, and an antenna 305.

The foregoing general purpose processor 301, the memory 302, the signal processor 303, the receiver 304, and the antenna 305 are coupled together by using a bus 306.

Specifically, the general purpose processor 301 controls an operation of the receiving device 1002. The memory 302 may include a read-only memory and a random access memory, and provide an instruction and data for the general purpose processor 301. The general purpose processor 301 may be a CPU, a DSP, an ASIC, an FPGA, or another programmable logical device. A part of the memory 302 may further include a non-volatile random access memory (NVRAM). The receiver 304 receives a signal by using the antenna 305, and the signal processor 303 decodes the received signal. Specifically, in this embodiment:

The receiver 304 is configured to receive a data packet sent by a transmitting device, where the data packet includes at least one orthogonal frequency division multiplexing OFDM symbol, where the OFDM symbol includes N sequentially numbered subcarriers, the N subcarriers are divided into L subblocks, each subblock includes ⌊N/L⌋ subcarriers, the ⌊N/L⌋ subcarriers in each subblock include M pilot subcarriers, start subcarriers of adjacent subblocks are adjacently numbered subcarriers, and a numbering interval is the same for adjacent subcarriers in each subblock; and each subblock is corresponding to one phase rotation signal, and signals carried on all subcarriers in each subblock are signals obtained by multiplying original signals by a corresponding phase rotation signal, where N is an even number, L is a positive integer, ⌊N/L⌋ is a positive integer, and M is a positive integer less than ⌊N/L⌋.

The signal processor 303 is configured to: obtain, according to signals carried on pilot subcarriers in the L subblocks, a product of the phase rotation signal corresponding to each subblock and a phase deviation signal, and obtain, by means of calculation, a conjugate signal corresponding to the product of the phase rotation signal corresponding to each subblock and the phase deviation signal; and obtain, according to the conjugate signal corresponding to each subblock and the signals carried on the subcarriers in each subblock, original signals carried on the subcarriers in each subblock.

The receiving device may be an AP or a STA, configured to execute the foregoing method embodiment corresponding to the receiving device. Implementation principles and technical effects are similar to those of the method embodiment, and details are not described herein again.

For the numbering and division of the foregoing subcarriers, reference may be made to descriptions of the foregoing method embodiment, and details are not described herein again.

A set to which the phase rotation signal belongs is {1, −1} or {1, j, −1, −j}.

The receiver 304 is further configured to receive signaling sent by the transmitting device. The signaling is used to indicate a structure of the OFDM symbol in the data packet and a quantity of subblocks included in the OFDM symbol. The structure of the OFDM symbol includes: a division of pilot subcarriers in the OFDM symbol in each subblock and a manner in which a signal is carried on each subcarrier in the OFDM symbol.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor (English: processor) to perform a part of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An OFDM-based data transmission method, comprising:

generating, by a transmitting device, a data packet, wherein the data packet comprises at least one orthogonal frequency division multiplexing (OFDM) symbol, wherein the OFDM symbol comprises N sequentially numbered subcarriers, the N subcarriers are divided into L subblocks, each subblock of the L subblocks comprises $\lfloor N/L \rfloor$ subcarriers including M pilot subcarriers, start subcarriers of adjacent subblocks are adjacently numbered subcarriers, and a numbering interval is the same for adjacent subcarriers in each subblock of the L subblocks; and each subblock of the L subblocks corresponds to one phase rotation signal, and signals carried on the subcarriers in each subblock of the L subblocks are signals obtained by multiplying original signals by a corresponding phase rotation signal, wherein N is an even number, L is a positive integer, $\lfloor N/L \rfloor$ is a positive integer, and M is a positive integer less than $\lfloor N/L \rfloor$; and sending, by the transmitting device, the data packet.

2. The method according to claim 1, wherein numbers of the N sequentially numbered subcarriers are −N/2, (−N/2)−1, . . . , 0, . . . , (N/2)−2, and (N/2)−1; and when L=4, that start subcarriers of adjacent subblocks are adjacently numbered subcarriers is: a number of a start subcarrier of a first subblock is −N/2, a number of a start subcarrier of a second subblock is (−N/2)+1, a number of a start subcarrier of a third subblock is (−N/2)+2, and a number of a start subcarrier of a fourth subblock is (−N/2)+3.

3. The method according to claim 2, wherein N=1024, M=8, and the numbering interval is 80 for adjacent pilot subcarriers in a same subblock; and correspondingly, numbers of M pilot subcarriers in the first subblock are: −312, −232, −152, −72, 8, 88, 168, and 248;

numbers of M pilot subcarriers in the second subblock are: −291, −211, −131, −51, 29, 109, 189, and 269;

numbers of M pilot subcarriers in the third subblock are: −270, −190, −110, −30, 50, 130, 210, and 290; and numbers of M pilot subcarriers in the fourth subblock are: −249, −169, −89, −9, 71, 151, 231, and 331.

4. The method according to claim 2, wherein N=1024, M=8, and the numbering interval is 80 for adjacent pilot subcarriers in a same subblock; and correspondingly, numbers of M pilot subcarriers in the first subblock are: −308, −228, −148, −68, 12, 92, 172, and 252;

numbers of M pilot subcarriers in the second subblock are: −291, −211, −131, −51, 29, 109, 189, and 269;

numbers of M pilot subcarriers in the third subblock are: −270, −190, −110, −30, 50, 130, 210, and 290; and numbers of M pilot subcarriers in the fourth subblock are: −249, −169, −89, −9, 71, 151, 231, and 331.

5. The method according to claim 2, wherein N=1536, M=12, and the numbering interval is 80 for adjacent pilot subcarriers in a same subblock; and correspondingly, numbers of M pilot subcarriers in the first subblock are: −472, −392, −312, −232, −152, −72, 8, 88, 168, 248, 328, and 408;
numbers of M pilot subcarriers in the second subblock are: −451, −371, −291, −211, −131, −51, 29, 109, 189, 269, 349, and 429;
numbers of M pilot subcarriers in the third subblock are: −430, −350, −270, −190, −110, −30, 50, 130, 210, 290, 370, and 450; and
numbers of M pilot subcarriers in the fourth subblock are: −409, −329, −249, −169, −89, −9, 71, 151, 231, 311, 391, and 471.

6. The method according to claim 2, wherein N=1536, M=12, and the numbering interval is 80 for adjacent pilot subcarriers in a same subblock; and
correspondingly, numbers of M pilot subcarriers in the first subblock are: −468, −388, −308, −228, −148, −68, 12, 92, 172, 252, 332, and 412;
numbers of M pilot subcarriers in the second subblock are: −451, −371, −291, −211, −131, −51, 29, 109, 189, 269, 349, and 429;
numbers of M pilot subcarriers in the third subblock are: −430, −350, −270, −190, −110, −30, 50, 130, 210, 290, 370, and 450; and
numbers of M pilot subcarriers in the fourth subblock are: −409, −329, −249, −169, −89, −9, 71, 151, 231, 311, 391, and 471.

7. An OFDM-based data transmission method, comprising:
receiving, by a receiving device, a data packet sent by a transmitting device, wherein the data packet comprises at least one orthogonal frequency division multiplexing (OFDM) symbol, wherein the OFDM symbol comprises N sequentially numbered subcarriers, the N subcarriers are divided into L subblocks, each subblock of the L subblocks comprises ⌊N/L⌋ subcarriers including M pilot subcarriers, start subcarriers of adjacent subblocks are adjacently numbered subcarriers, and a numbering interval is the same for adjacent subcarriers in each subblock of the L subblocks; and each subblock of the L subblocks corresponds to one phase rotation signal, and signals carried on the subcarriers in each subblock of the L subblocks are signals obtained by multiplying original signals by a corresponding phase rotation signal, wherein N is an even number, L is a positive integer, ⌊N/L⌋ is a positive integer, and M is a positive integer less than ⌊N/L⌋;
obtaining, by the receiving device and according to signals carried on pilot subcarriers in the L subblocks, a product of the phase rotation signal corresponding to each subblock of the L subblocks and a phase deviation signal;
obtaining a conjugate signal corresponding to the product of the phase rotation signal corresponding to each subblock of the L subblocks and the phase deviation signal, wherein the phase deviation signal represents a phase deviation between the transmitting device and the receiving device; and
obtaining, by the receiving device and according to the conjugate signal corresponding to each subblock and the signals carried on the subcarriers in each subblock of the L subblocks, original signals carried on the subcarriers in each subblock of the L subblocks.

8. The method according to claim 7, wherein numbers of the N sequentially numbered subcarriers are −N/2, (−N/2)−1, . . . , 0, . . . , (N/2)−2, and (N/2)−1; and
when L=4, that start subcarriers of adjacent subblocks are adjacently numbered subcarriers is: a number of a start subcarrier of a first subblock is −N/2, a number of a start subcarrier of a second subblock is (−N/2)+1, a number of a start subcarrier of a third subblock is (−N/2)+2, and a number of a start subcarrier of a fourth subblock is (−N/2)+3.

9. The method according to claim 8, wherein N=1024, M=8, and the numbering interval is 80 for adjacent pilot subcarriers in a same subblock; and
correspondingly, numbers of M pilot subcarriers in the first subblock are: −312, −232, −152, −72, 8, 88, 168, and 248;
numbers of M pilot subcarriers in the second subblock are: −291, −211, −131, −51, 29, 109, 189, and 269;
numbers of M pilot subcarriers in the third subblock are: −270, −190, −110, −30, 50, 130, 210, and 290; and
numbers of M pilot subcarriers in the fourth subblock are: −249, −169, −89, −9, 71, 151, 231, and 331.

10. The method according to claim 8, wherein N=1024, M=8, and the numbering interval is 80 for adjacent pilot subcarriers in a same subblock; and
correspondingly, numbers of M pilot subcarriers in the first subblock are: −308, −228, −148, −68, 12, 92, 172, and 252;
numbers of M pilot subcarriers in the second subblock are: −291, −211, −131, −51, 29, 109, 189, and 269;
numbers of M pilot subcarriers in the third subblock are: −270, −190, −110, −30, 50, 130, 210, and 290; and
numbers of M pilot subcarriers in the fourth subblock are: −249, −169, −89, −9, 71, 151, 231, and 331.

11. The method according to claim 8, wherein N=1536, M=12, and the numbering interval is 80 for adjacent pilot subcarriers in a same subblock; and
correspondingly, numbers of M pilot subcarriers in the first subblock are: −472, −392, −312, −232, −152, −72, 8, 88, 168, 248, 328, and 408;
numbers of M pilot subcarriers in the second subblock are: −451, −371, −291, −211, −131, −51, 29, 109, 189, 269, 349, and 429;
numbers of M pilot subcarriers in the third subblock are: −430, −350, −270, −190, −110, −30, 50, 130, 210, 290, 370, and 450; and
numbers of M pilot subcarriers in the fourth subblock are: −409, −329, −249, −169, −89, −9, 71, 151, 231, 311, 391, and 471.

12. The method according to claim 8, wherein N=1536, M=12, and the numbering interval is 80 for adjacent pilot subcarriers in a same subblock; and
correspondingly, numbers of M pilot subcarriers in the first subblock are: −468, −388, −308, −228, −148, −68, 12, 92, 172, 252, 332, and 412;
numbers of M pilot subcarriers in the second subblock are: −451, −371, −291, −211, −131, −51, 29, 109, 189, 269, 349, and 429;
numbers of M pilot subcarriers in the third subblock are: −430, −350, −270, −190, −110, −30, 50, 130, 210, 290, 370, and 450; and
numbers of M pilot subcarriers in the fourth subblock are: −409, −329, −249, −169, −89, −9, 71, 151, 231, 311, 391, and 471.

13. A transmitting device, comprising:
at least one signal processor, the at least one signal processor configured to generate a data packet, wherein the data packet comprises at least one orthogonal frequency division multiplexing (OFDM) symbol, wherein the OFDM symbol comprises N sequentially numbered subcarriers, the N subcarriers are divided into L subblocks, each subblock of the L subblocks comprises ⌊N/L⌋ subcarriers including M pilot subcarriers, start subcarriers of adjacent subblocks are adjacently numbered subcarriers, and a numbering interval is the same for adjacent subcarriers in each subblock of the L subblocks; and each subblock of the L subblocks corresponds to one phase rotation signal, and signals carried on the subcarriers in each subblock of the L subblocks are signals obtained by multiplying original signals by a corresponding phase rotation signal, wherein N is an even number, L is a positive integer, ⌊N/L⌋ is a positive integer, and M is a positive integer less than ⌊N/L⌋; and a transmitter, the transmitter configured to send the data packet.

14. The transmitting device according to claim 13, wherein numbers of the N sequentially numbered subcarriers are −N/2, (−N/2)−1, . . . , 0, . . . , (N/2)−2, and (N/2)−1; and when L=4, that start subcarriers of adjacent subblocks are adjacently numbered subcarriers is: a number of a start subcarrier of a first subblock is −N/2, a number of a start subcarrier of a second subblock is (−N/2)+1, a number of a start subcarrier of a third subblock is (−N/2)+2, and a number of a start subcarrier of a fourth subblock is (−N/2)+3.

15. The transmitting device according to claim 14, wherein N=1024, M=8, and the numbering interval is 80 for adjacent pilot subcarriers in a same subblock; and correspondingly, numbers of M pilot subcarriers in the first subblock are: −312, −232, −152, −72, 8, 88, 168, and 248;

numbers of M pilot subcarriers in the second subblock are: −291, −211, −131, −51, 29, 109, 189, and 269;

numbers of M pilot subcarriers in the third subblock are: −270, −190, −110, −30, 50, 130, 210, and 290; and numbers of M pilot subcarriers in the fourth subblock are: −249, −169, −89, −9, 71, 151, 231, and 331.

16. The transmitting device according to claim 14, wherein N=1024, M=8, and the numbering interval is 80 for adjacent pilot subcarriers in a same subblock; and correspondingly, numbers of M pilot subcarriers in the first subblock are: −308, −228, −148, −68, 12, 92, 172, and 252;

numbers of M pilot subcarriers in the second subblock are: −291, −211, −131, −51, 29, 109, 189, and 269;

numbers of M pilot subcarriers in the third subblock are: −270, −190, −110, −30, 50, 130, 210, and 290; and numbers of M pilot subcarriers in the fourth subblock are: −249, −169, −89, −9, 71, 151, 231, and 331.

17. The transmitting device according to claim 14, wherein N=1536, M=12, and the numbering interval is 80 for adjacent pilot subcarriers in a same subblock; and correspondingly, numbers of M pilot subcarriers in the first subblock are: −472, −392, −312, −232, −152, −72, 8, 88, 168, 248, 328, and 408;

numbers of M pilot subcarriers in the second subblock are: −451, −371, −291, −211, −131, −51, 29, 109, 189, 269, 349, and 429;

numbers of M pilot subcarriers in the third subblock are: −430, −350, −270, −190, −110, −30, 50, 130, 210, 290, 370, and 450; and numbers of M pilot subcarriers in the fourth subblock are: −409, −329, −249, −169, −89, −9, 71, 151, 231, 311, 391, and 471.

18. The transmitting device according to claim 14, wherein N=1536, M=12, and the numbering interval is 80 for adjacent pilot subcarriers in a same subblock; and correspondingly, numbers of M pilot subcarriers in the first subblock are: −468, −388, −308, −228, −148, −68, 12, 92, 172, 252, 332, and 412;

numbers of M pilot subcarriers in the second subblock are: −451, −371, −291, −211, −131, −51, 29, 109, 189, 269, 349, and 429;

numbers of M pilot subcarriers in the third subblock are: −430, −350, −270, −190, −110, −30, 50, 130, 210, 290, 370, and 450; and numbers of M pilot subcarriers in the fourth subblock are: −409, −329, −249, −169, −89, −9, 71, 151, 231, 311, 391, and 471.

* * * * *